(12) United States Patent
Sellnau et al.

(10) Patent No.: US 6,705,259 B1
(45) Date of Patent: Mar. 16, 2004

(54) 3-STEP CAM-PROFILE-SWITCHING ROLLER FINGER FOLLOWER

(75) Inventors: Mark C. Sellnau, Bloomfield Hills, MI (US); Hermes A. Fernandez, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/412,520

(22) Filed: Apr. 11, 2003

Related U.S. Application Data

(60) Provisional application No. 60/432,198, filed on Dec. 10, 2002.

(51) Int. Cl.$^7$ .................................................. F01L 1/34
(52) U.S. Cl. ............................... 123/90.16; 123/90.17; 123/90.2
(58) Field of Search ....................... 123/90.16, 90.15, 123/90.17, 90.18, 90.2, 90.21, 90.31, 90.6

(56) References Cited

U.S. PATENT DOCUMENTS

| | | | | |
|---|---|---|---|---|
| 4,788,946 A | * | 12/1988 | Inoue et al. | 123/90.16 |
| 4,887,563 A | * | 12/1989 | Ishida et al. | 123/90.16 |
| 5,085,182 A | * | 2/1992 | Nakamura et al. | 123/90.16 |
| 5,159,905 A | * | 11/1992 | Sugiuchi et al. | 123/90.16 |
| 5,388,552 A | * | 2/1995 | Sugimoto et al. | 123/90.16 |
| 5,515,820 A | * | 5/1996 | Sugimoto et al. | 123/90.16 |
| 5,651,336 A | * | 7/1997 | Rygiel et al. | 123/90.16 |
| 5,794,576 A | * | 8/1998 | Hara et al. | 123/90.16 |
| 6,032,624 A | * | 3/2000 | Tsuruta et al. | 123/90.16 |

* cited by examiner

*Primary Examiner*—Thomas Denion
*Assistant Examiner*—Kyle Riddle
(74) *Attorney, Agent, or Firm*—Patrick M. Griffin

(57) ABSTRACT

A three-step cam-profile-switching roller finger follower includes a body with low-lift, high-lift and medium-lift body sections. Low, high and medium cam followers are carried by the low-lift, high-lift and medium-lift body sections, respectively. At least one locking assembly selectively couples together and decouples the low and high-lift body sections, and selectively couples together and decouples the low and medium-lift body sections.

2 Claims, 17 Drawing Sheets

LIGHT-LOAD, LOW-SPEED

PART-LOAD
LOW-TO-MEDIUM SPEED

3-STEP OPERATING REGIONS

SUMMARY OF OPERATING MODES

| Operating Mode | Engine Speed Range | Engine BMEP Range (kPa) | Strategy | Valve Lift Profile | IVO (CAD) | IVC (CAD) | EVO (CAD) | EVC (CAD) |
|---|---|---|---|---|---|---|---|---|
| Cold Start Warm Idle | 1000-1200 | 200-300 | LIVO | LLC | 380/400 | 535/555 | 95/110 | 375/390 |
| | 600-800 | 100-200 | EIVC | LLC | 300/340 | 455/495 | 95/110 | 375/390 |
| Light-Load, Low-Speed | 600-4500 | 0-500 | EIVC | LLC | 290/330 | 445/485 | 100/125 | 380/405 |
| Part-Load, Low-to-Medium Speed | 600-6000 | 500-1100 | EIVC Best Volumetric Efficiency | MLC | 270/310 | 495/535 | 100/135 | 380/415 |
| High-Load, Low-to-Medium Speed | 600-2500 | 900-1100 | Best Volumetric Efficiency | MLC | 320/360 | 545/585 | 100/120 | 380/400 |
| High-Load, Medium-to-High Speed | 2500-8000 | 1000-1200 | | HLC | 300/360 | 580/640 | 95/110 | 375/390 |

FIG.17

3-STEP CAM-PROFILE-SWITCHING ROLLER FINGER FOLLOWER

CROSS-REFERENCE TO RELATED APPLICATIONS

This application claims the benefit of U.S. Provisional Patent Application Serial No. 60/432,198, filed Dec. 10, 2002.

TECHNICAL FIELD

The present invention relates generally to roller finger followers used in internal combustion engines. More particularly, the present invention relates to a roller finger follower rocker arm device that accomplishes cam profile switching in an internal combustion engine.

BACKGROUND OF THE INVENTION

Historically, the efficiency, emissions, and performance of internal combustion engines have been adversely limited by fixed valve lift profiles, i.e., valve lift profiles wherein the timing of the opening and closing of the valves is fixed relative to the angular position of the engine crankshaft and the amount of lift imparted to the valves is also fixed. By fixing the valve lift profiles of the engine, inherent compromises were made between low-speed operation (idle) and high-speed operation for peak power. Importantly, engines having fixed valve lift profiles must incorporate a throttle device to control the airflow (and output) of the engine. Throttle devices introduce large throttling losses (pumping work) and greatly reduce the efficiency of the engine, and also negatively impact emissions of oxides of nitrogen (NOx) and hydrocarbons (HC).

In contrast, modern internal combustion engines may utilize one of several methods and/or devices to vary the valve lift profile to, at least in part, control the flow of gas and/or air into and/or out of the engine cylinders. One such method is two-step cam-profile switching, wherein the engine valves, usually the intake valves, are actuated by a selected one of two valve lift profiles. Typically, the two valve lift profiles consist of a high-lift long-duration lift profile designed to provide high power output at high engine operating speeds, and a low-lift short-duration lift profile that is designed for high efficiency and low NOx emissions at low operating speeds.

Selection of, or switching between, the valve lift profiles is accomplished by a cam-profile-switching device, such as, for example, a mode-switching or two-step roller finger follower (RFF). Generally, a two-step RFF includes a body and a central roller that is selectively coupled to and decoupled from the RFF body by a shaft. The central roller is engaged by a first cam lobe of the engine camshaft. When the shaft carrying the central roller is coupled to the RFF body, engagement of the first cam lobe with the central roller causes the RFF body to pivot thereby actuating an associated engine valve according to the lift profile of the first cam lobe. When the shaft is decoupled from the RFF body, engagement of the central roller by the first cam lobe does not cause the RFF body to pivot. Rather, the shaft and central roller reciprocate relative to the RFF body thereby absorbing the motion of the first cam lobe. The body of the RFF, or a pair of outer rollers affixed to opposite sides of the RFF body, is engaged by a corresponding pair of second cam lobes. When the shaft carrying the central roller is decoupled from the RFF body, the RFF body is pivoted according to the lift profile of the pair of second cam lobes. Typically, the first cam lobe is the higher lift cam, and the pair of second cam lobes are zero-lift or low-lift cam lobes. Such a two-step RFF is more fully described in commonly-assigned U.S. Pat. No. 6,467,445, which issued Oct. 22, 2002.

Two-step cam profile switching systems are relatively simple and are operable over a relatively wide range of engine operating speeds. Further such systems are relatively easy to package on new and even existing engines. By operating the two-step cam-profile-switching mechanism in conjunction with a cam phaser a wide range of variation in the valve lift characteristic is obtained. Although such two-step variable valve actuation (VVA) systems achieve a relatively wide range of variation in the valve lift profile, they nonetheless represent a tradeoff between mechanical simplicity and less than continuous variation they provide relative to the mechanical complexity yet full variation that a continuously-variable VVA system provides. Two-Step VVA systems also require cam phasers having a wide range of authority and high or fast response rates in order to achieve the full benefit of these systems.

Therefore, what is needed in the art is a cam-profile-switching system that enables an increased and relatively wide range of variation in the valve lift profiles, and yet is relatively simple.

Furthermore, what is needed in the art is a cam-profile-switching system that provides an increased and relatively wide range of variation in the valve lift profiles over a relatively wide range of engine operating speeds.

Moreover, what is needed is a method of cam-profile-switching that achieves an increased and relatively wide range of variation in the valve lift profiles, and does so with conventional cam phasers having conventional cam phaser rates.

SUMMARY OF THE INVENTION

The present invention provides a three-step cam-profile-switching roller finger follower.

The present invention comprises, in one form thereof, a body with low-lift, high-lift and medium-lift body sections. Low, high and medium cam followers are carried by the low-lift, high-lift and medium-lift body sections, respectively. At least one locking assembly selectively couples together and decouples the low and high-lift body sections, and selectively couples together and decouples the low and medium-lift body sections.

An advantage of the present invention is that an increased range of variation in the valve lift profile is achieved with relative mechanical simplicity.

Another advantage of the present invention is that an increased range of variation in the valve lift profile is achieved across an increased range of engine operating speeds.

Yet another advantage of the present invention is that full potential of the system is achieved with conventional cam phasers having conventional cam phaser rates.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein:

FIG. 17 is a chart summarizing the operating modes and corresponding engine operating conditions of the TSVVA of FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
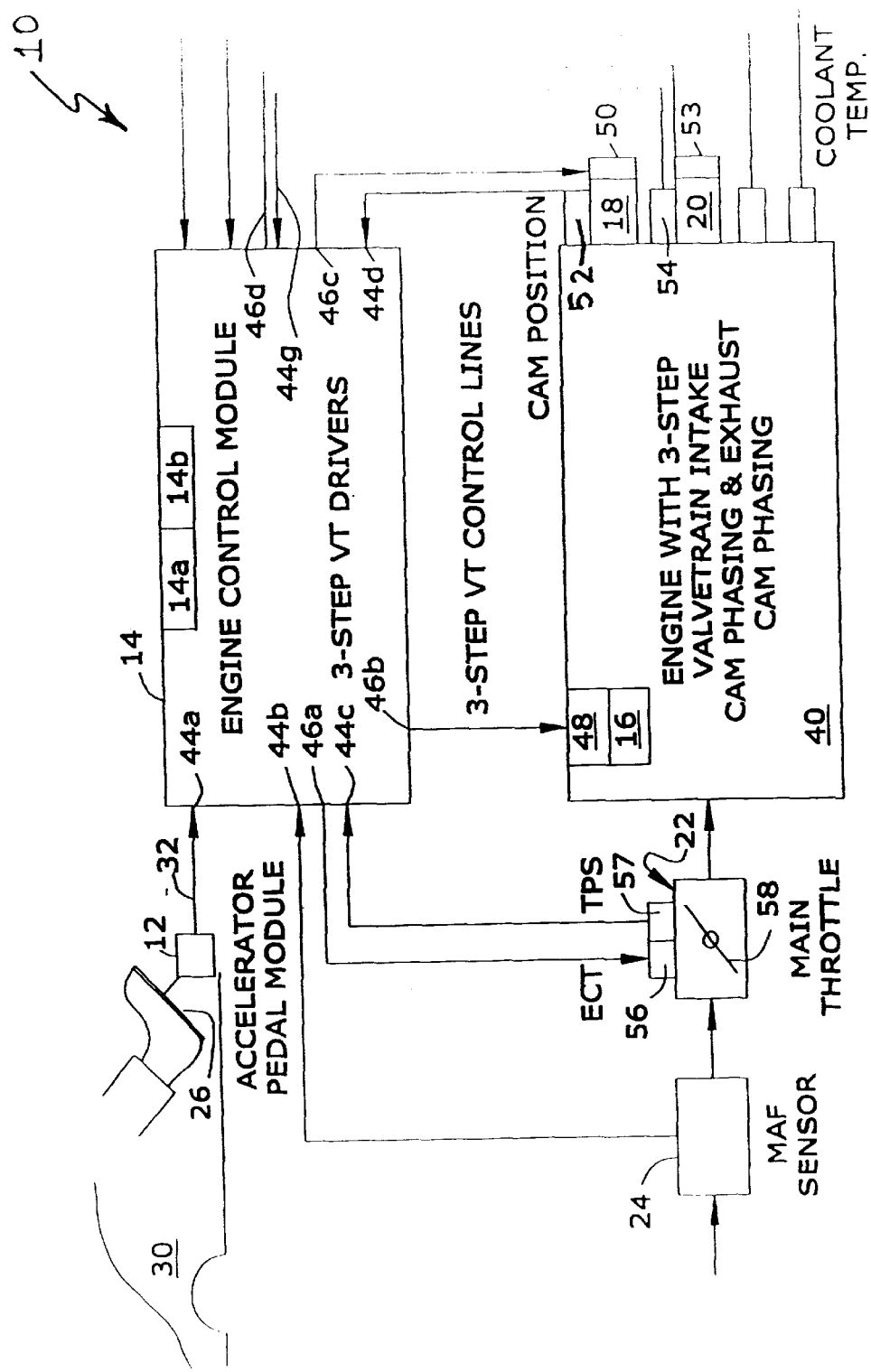
FIG. 1 is a schematic diagram of one embodiment of a three-step variable valve actuation (TSVVA) system of the present invention.

Referring now to the drawings, and particularly to FIG. 1, a schematic diagram of one embodiment of a three-step variable valve actuation (TSVVA) system of the present invention is shown. TSVVA system 10 includes pedal module 12, engine control module (ECM) 14, three-step switching devices 16 (only one shown), intake cam phaser 18, exhaust cam phaser 20, electronic throttle control module (ETC) 22, and mass air flow (MAF) sensor 24.

Pedal module 12 converts the position of gas pedal 26 of motor vehicle 30 to a desired load command 32, such as, for example, a pulse-width modulated electrical signal. Desired load command 32 is indicative of the current position, direction of movement, and rate of movement of gas pedal 26, and determines at least in part the load operating conditions of engine 40. Pedal module 12 is electrically connected to ECM 14, as will be described more particularly hereinafter, such that ECM 14 receives desired load command 32.

ECM 14 is a conventional engine control module, including, for example, a microprocessor (not shown) interconnected with various interface circuitry, read only memory 14a and random access memory 14b. ECM 14 further includes a plurality of inputs and outputs through which ECM 14 transmits and receives data to and from the devices connected thereto. More particularly, ECM 14 includes inputs 44a–44g and outputs 46a–d, the functions and interconnections of which will be described in greater detail hereinafter. Pedal module 12 is electrically connected with pedal input 44a, and provides desired load command 32 to ECM 14.

Three-step switching devices 16, such as, for example, three-step rocker arm assemblies or three-step roller finger followers to be described more particularly hereinafter, are switchable between a first/low-lift position, a second/medium-lift position, and a third/high-lift position. When a three-step switching device 16 is in the first/low-lift position, the associated engine valve (not shown) is actuated according to a low-lift cam of a camshaft (FIGS. 13 and 15, described more particularly hereinafter) of engine 40. The low-lift cam of the camshaft engages the three-step switching device 16, and pivots the three-step switching device 16 to thereby actuate the associated valve in a manner that is generally similar to valve actuation via a conventional rocker arm or roller finger follower. The low-lift cam imparts a relatively low amount of lift $L_{LOW}$, such as, for example, from approximately 3.0 millimeters (mm) to approximately 5.5 mm, to the valve. The low-lift valve profile has a total duration $D_{LOW}$, such as, for example, from approximately 100 crank angle degrees (CAD) to approximately 160 CAD. This low-lift valve lift profile is plotted as lift profile LLP in FIG. 2.

Similarly, with three-step switching device 16 in the second or medium-lift position the associated engine valve is actuated/lifted according to a medium-lift cam of the camshaft to thereby impart a medium amount of lift $L_{MED}$, such as, for example, from approximately 7.0 mm to approximately 9.0 mm, to the valve. The medium-lift valve profile has a total duration $D_{MED}$, such as, for example, from approximately 180 CAD to approximately 230 CAD. This medium-lift valve lift profile is plotted as lift profile MLP in FIG. 2.

Likewise, with three-step switching device 16 in the third or high-lift position, the associated engine valve is actuated/lifted according to a high-lift cam of the camshaft to thereby impart a relatively high amount of lift $L_{HIGH}$, such as, for example, from approximately 11.0 mm to approximately 13.0 mm, to the valve. The high-lift valve profile has a total duration $D_{HIGH}$, such as, for example, from approximately 280 crank angle degrees (CAD) to approximately 320 CAD. This high-lift valve lift profile is plotted as lift profile HLP in FIG. 2.

The heights or amounts of lift for each of lifts $L_{LOW}$, $L_{MED}$, and $L_{HIGH}$, and the total durations $D_{LOW}$, $D_{MED}$, $D_{HIGH}$ of each of the LLP, MLP and HLP lift profiles, are fixed by the lift profile of the corresponding or actuating cam lobe as ground on the engine camshaft.

Generally, the method of the present invention includes selecting between six primary operating modes, i.e., cold start idle, warm idle, light-load low speed, part-load lowto-medium speed, high-load low-to-medium speed, and high-load medium-to-high speed operating modes, dependent at least in part upon engine operating conditions and parameters. More particularly, albeit still generally, the method of the present invention conjunctively controls three-step switching devices 16 and input and output cam phasers 18 and 20, respectively, dependent at least in part upon engine operating parameters and conditions to select a particular operating mode in order to increase fuel efficiency, decrease undesirable NOx and HC emissions, increase low-to-medium speed torque, and increase performance. The method of the present invention, by selecting a particular operating mode suited to the particular engine operating conditions and parameters, achieves a level of improvement in fuel economy, an increase in torque and performance, and a reduction in emissions that approach the level of improvement achieved in an engine incorporating a more complex continuously variable valve actuating mechanism(s), and yet does so across a wider range of engine operating speeds and with reduced cost and complexity relative thereto.

Figure 3:
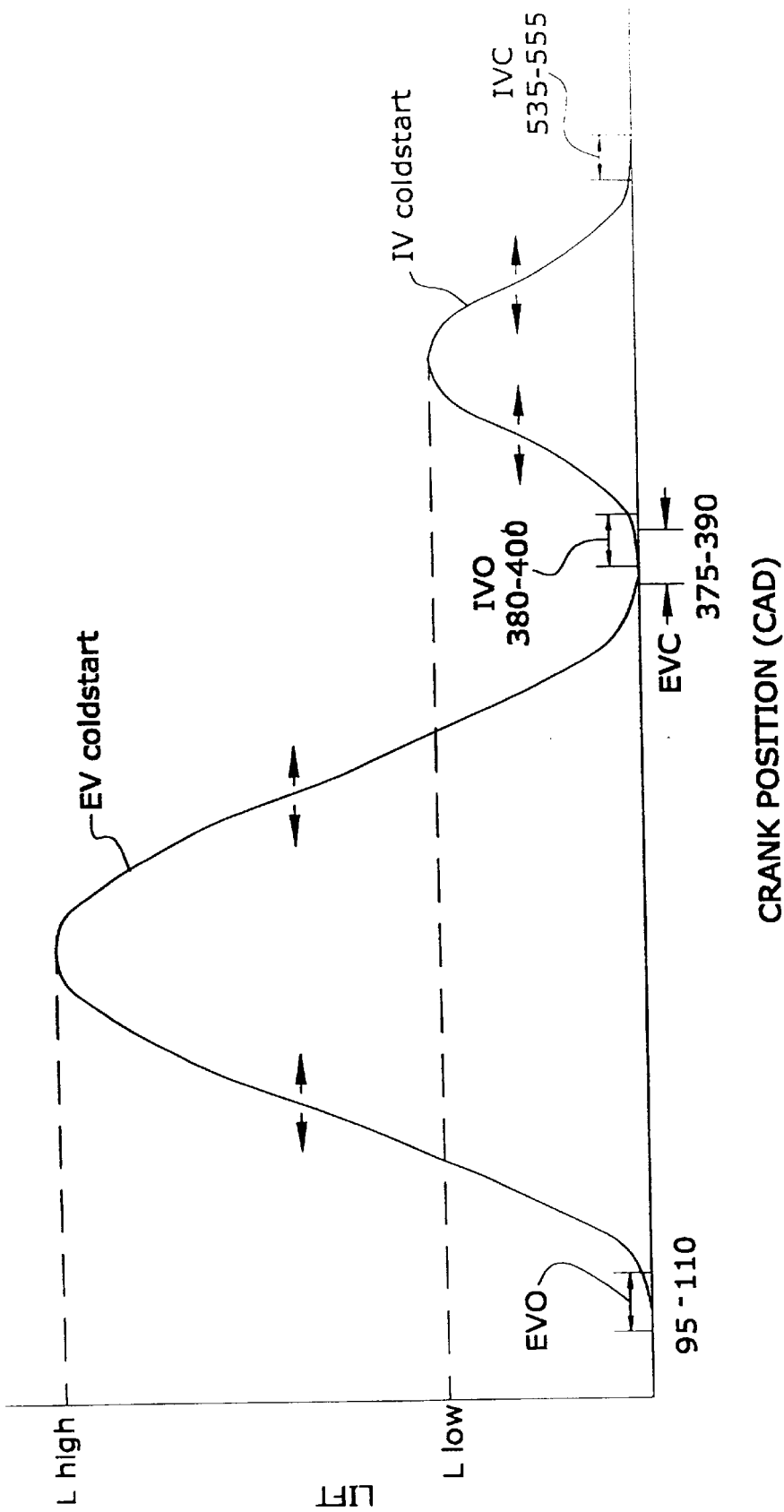
FIG. 3 is a plot of the exhaust and intake valve lift profiles for the TSVVA of FIG. 1 operating in the cold-start idle mode.

The first primary operating mode, i.e., cold start idle, controls three-step switching devices 16 and intake and exhaust cam phasers 18 and 20, respectively, to place TSVVA system 10, and thereby engine 40, into a late intake valve opening (LIVO) operating mode or strategy wherein the intake valve opening is fully retarded and the exhaust valve opening is substantially fully advanced. These are the respective default positions for the phasers. First or cold start idle operating mode is invoked for BMEPs of from approximately 200 to approximately 300 kilopascals (kPa) and at engine speeds of from approximately 1,000 to approximately 1,400 rpm. The exhaust and intake valve lift profiles, designated $EV_{COLDSTART}$ and $IV_{COLDSTART}$, respectively, for the cold-start idle operating mode are shown in FIG. 3.

Lift profile $EV_{COLDSTART}$ shows that in the cold start idle operating mode exhaust cam phaser 20 is controlled to implement an exhaust valve opening (EVO) that occurs from approximately 95 to approximately 110 crank angle degrees, and an exhaust valve closing (EVC) that occurs at approximately 375 to approximate 390 crank angle degrees. The lift of the exhaust valves is fixed at a relatively high lift, such as, for example, from approximately 10 mm to approximately 12 mm, by the associated actuating cam lobes. It should be noted, however, that actual exhaust valve lift will depend at least in part upon engine size.

Lift profile $IV_{COLDSTART}$ shows that in the cold start idle operating mode intake cam phaser 18 is controlled to implement an intake valve opening (IVO) that occurs from approximately 380 to approximately 400 crank angle degrees, and an intake valve closing (IVC) that occurs at approximately 535 to approximately 555 crank angle degrees. The three-step switching devices 16 that actuate the intake valves are placed into the low-lift position or mode, and are thus engaged by corresponding low-lift cams of the camshaft of engine 40 which impart low lift $L_{LOW}$ to the corresponding intake valves.

The cold start idle operating mode, as described above, achieves a reduction of from approximately 30 to approximately 50 percent in the level of undesirable hydrocarbon emissions relative to a conventional fixed-valve-timing engine in the critical first twenty seconds of engine operation when the exhaust catalytic converter is not operating.

Figure 4:
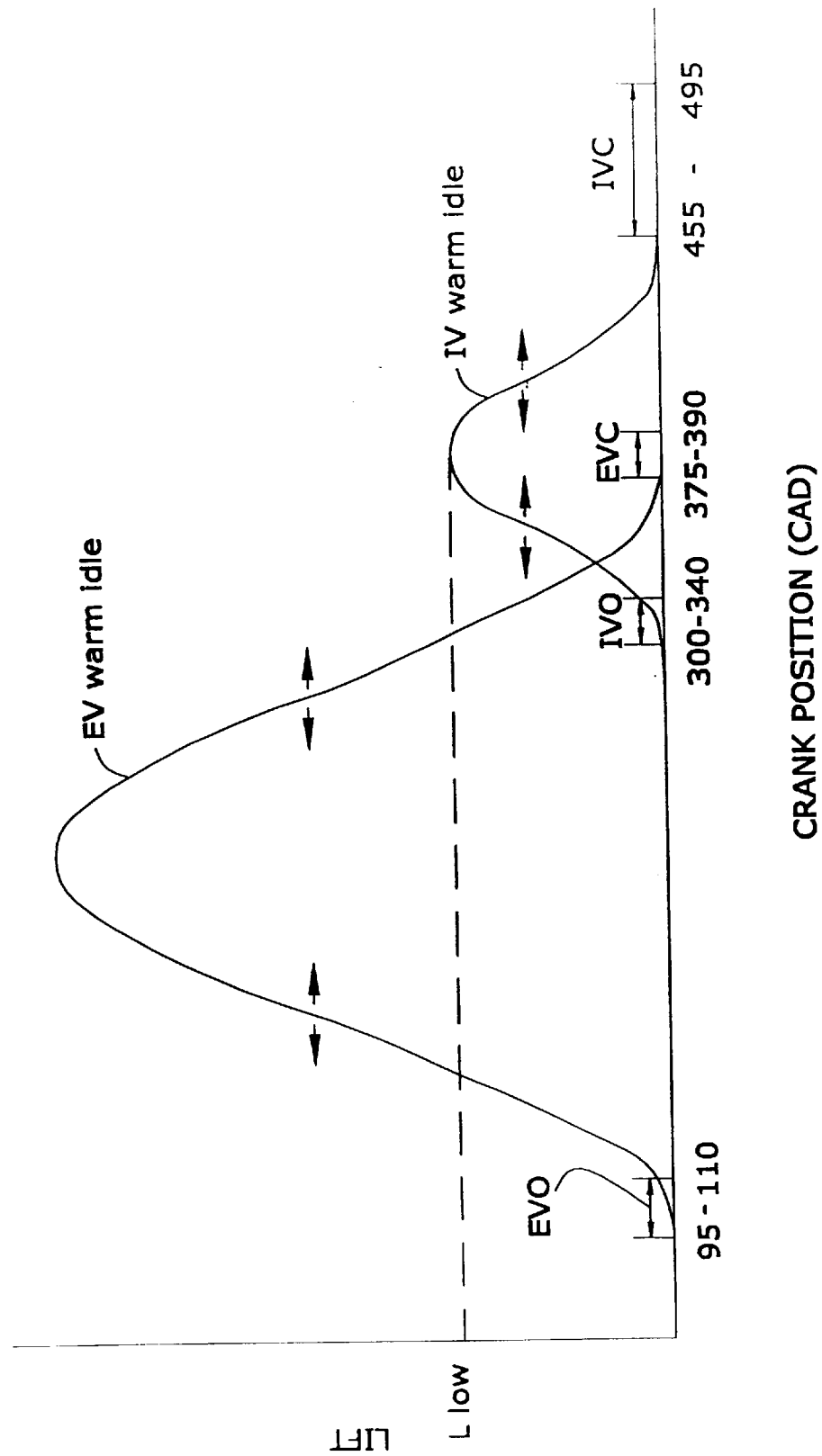
FIG. 4 is a plot of the exhaust and intake valve lift profiles for the TSVVA of FIG. 1 operating in the warm-idle mode.

The second primary operating mode, i.e., warm idle, controls three-step switching devices 16 and intake and exhaust cam phasers 18 and 20, respectively, to place TSVVA system 10, and thereby engine 40, into an early intake valve closing (EIVC) operating mode wherein exhaust valve opening is fully advanced and intake valve opening is optimized for improved efficiency. Second or warm idle operating mode is invoked for BMEPs of less than approximately 100 to approximately 200 kPa and at engine speeds of from approximately 600 to approximately 800 rpm. The exhaust and intake valve lift profiles, designated $EV_{WARM\ IDLE}$ and $IV_{WARM\ IDLE}$, respectively, for the warm idle operating mode are shown in FIG. 4.

Lift profile $EV_{WARM\ IDLE}$ shows that in the warm idle operating mode exhaust cam phaser 18 is controlled to implement an EVO that occurs from approximately 95 to approximately 110 CAD, and an EVC that occurs at approximately 375 to approximately 390 CAD. The lift of the exhaust valves is fixed as described above.

Lift profile $IV_{WARM\ IDLE}$ shows that in the warm idle operating mode intake cam phaser 20 is controlled to implement an early or advanced IVO that occurs from approximately 300 to approximately 340 CAD, and an IVC that occurs at approximately 455 to approximate 495 crank angle degrees. The three-step switching devices 16 that actuate the intake valves are placed into the low-lift position or mode, and are thus engaged by corresponding low-lift cams of the camshaft of engine 40 which impart low lift $L_{LOW}$ to the corresponding intake valves.

The warm idle operating mode, as described above, achieves an increased level of efficiency in the operation of engine 40 by reducing pumping losses, advancing EVO to reduce residuals, and improves combustion stability at engine idle thereby potentially enabling a reduction in engine idle speed.

Figure 5:
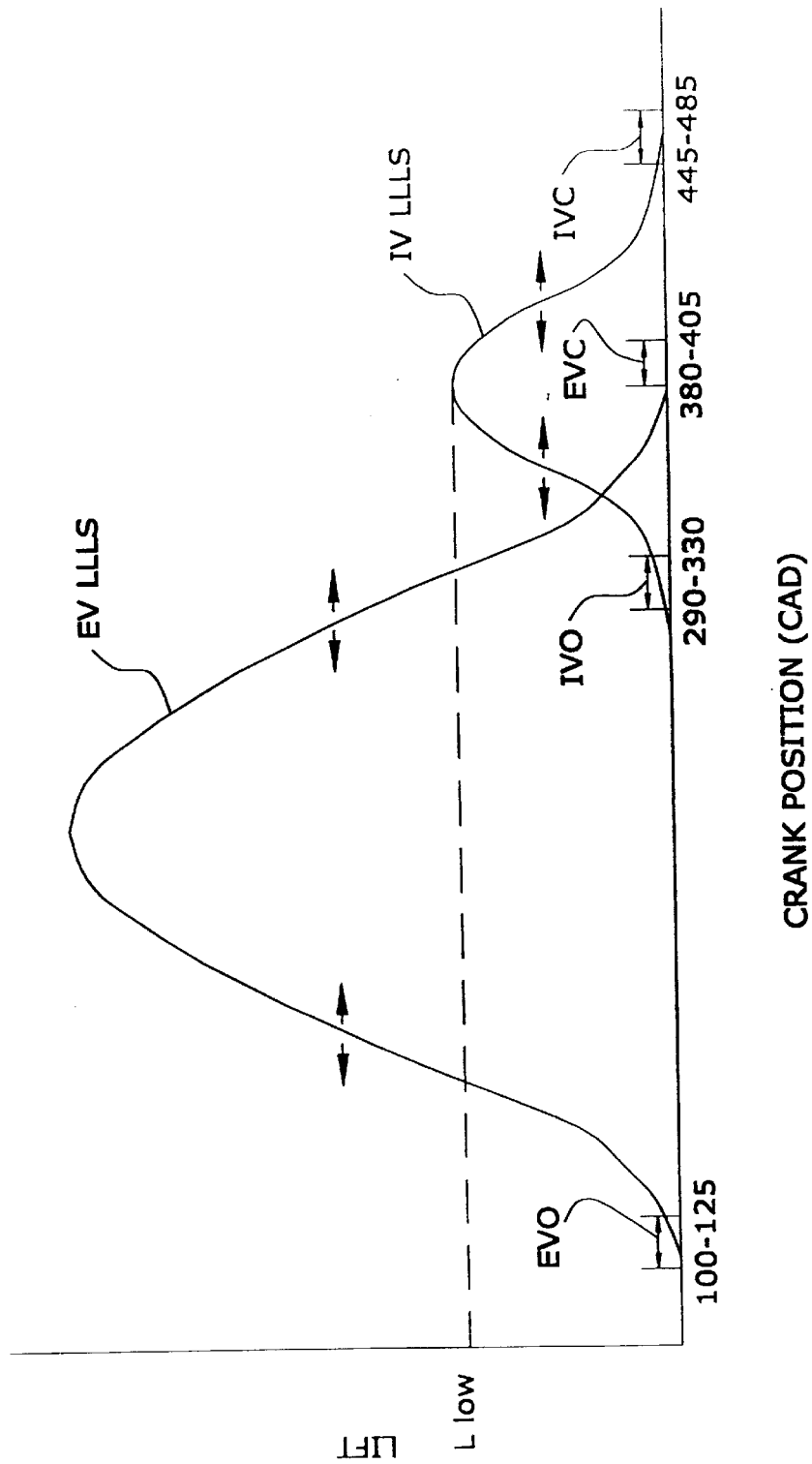
FIG. 5 is a plot of the exhaust and intake valve lift profiles for the TSVVA of FIG. 1 operating in the light-load low-speed mode.

The third primary operating mode, i.e., light-load low speed (LLLS), controls three-step switching devices 16 and intake and exhaust cam phasers 18 and 20, respectively, to place TSVVA system 10, and thereby engine 40, into an early intake valve closing (EIVC) operating mode wherein intake and exhaust valve openings are timed for achieving peak efficiency and minimizing NOx emissions. More particularly, the exhaust cam phaser is retarded somewhat to minimize blowdown losses, and the intake cam phaser is moderately advanced to increase the early intake valve closing (EIVC) effect, and to control internal residuals at or near the combustion dilution limit. Third or LLLS operating mode is invoked for BMEPs of less than approximately 500 kPa and for engine speeds from approximately 600 to approximately 4,500 rpm. The exhaust and intake valve lift profiles, designated $EV_{LLLS}$ and $IV_{LLLS}$, respectively, for the LLLS operating mode are shown in FIG. 5.

Lift profile $EV_{LLLS}$ shows that in the light-load low-speed operating mode exhaust cam phaser 20 is controlled to implement an EVO that occurs from approximately 100 to approximately 125 CAD, and an EVC that occurs from approximately 380 to approximately 405 CAD. The lift of the exhaust valves is fixed as described above.

Lift profile $IV_{LLLS}$ shows that in the LLLS operating mode intake cam phaser 18 is controlled to implement an early or advanced IVO that occurs from approximately 290 to approximately 330 CAD, and an IVC that occurs at approximately 445 to approximate 485 crank angle degrees. The three-step switching devices that actuate the intake valves are placed into the low-lift position or mode, and are thus engaged by corresponding low-lift cams of the camshaft of engine 40 which impart low lift $L_{LOW}$ to the corresponding intake valves.

The LLLS operating mode, as described above, significantly improves fuel efficiency. In this mode, the timing of the IVC is advanced and valve overlap is regulated to achieve high levels of internal residuals for operation at or near the combustion dilute limit. This increases manifold pressure and thereby reduces pumping losses (i.e., the EIVC effect). Blow down losses are also minimized by retarding the exhaust phaser from the default value. Indicated thermal efficiency is increased due to the high levels of internal residuals, which improves the ratio of specific heats of the gases, and NOx emissions are also substantially reduced due to reduced flame temperatures.

Figure 6:
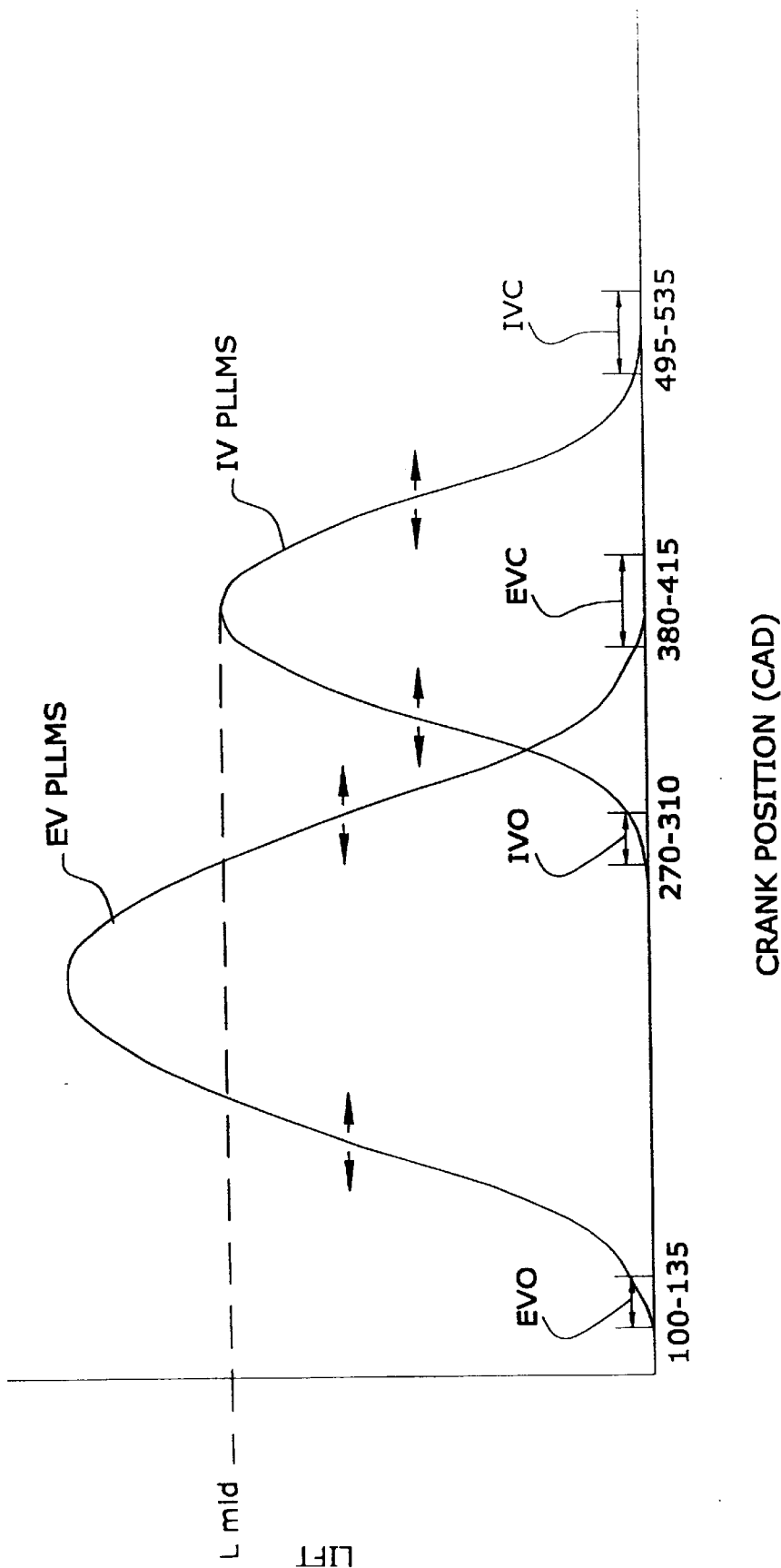
FIG. 6 is a plot of the exhaust and intake valve lift profiles for the TSVVA of FIG. 1 operating in the part-load low-to-medium speed mode.

The fourth primary operating mode, i.e., part-load low-to-medium speed (PLLMS), controls three-step switching devices 16 and intake and exhaust cam phasers 18 and 20, respectively, to place TSVVA system 10, and thereby engine 40, into an early intake valve closing (EIVC) operating mode wherein intake and exhaust valve openings are timed for increased charge dilution to reduce pumping losses, improve efficiency and reduce NOx emissions. Fourth or PLLMS operating mode is invoked for BMEPs of from approximately 500 to approximately 1,100 kPa and for engine speeds of from approximately 600 to approximately 6,000 rpm. The exhaust and intake valve lift profiles, designated $EV_{PLLMS}$ and $IV_{PLLMS}$, respectively, for the PLLMS operating mode are shown in FIG. 6.

Lift profile $EV_{PLLMS}$ shows that in the PLLMS operating mode exhaust cam phaser 20 is controlled to implement an EVO that occurs from approximately 110 to approximately 135 CAD, and an EVC that occurs from approximately 380 to approximately 415 CAD. The lift of the exhaust valves is fixed as described above.

Lift profile $IV_{PLLMS}$ shows that in the PLLMS operating mode intake cam phaser 18 is controlled to implement an even earlier or further advanced IVO relative to the LLLS operating mode, and that occurs from approximately 270 to approximately 310 CAD, and an IVC that occurs at approximately 495 to approximate 535 crank angle degrees. The three-step switching devices that actuate the intake valves are placed into the medium-lift position or mode, and are thus engaged by corresponding medium-lift cams of the camshaft of engine 40 which impart medium-level lift $L_{MED}$ to the corresponding intake valves.

The PLLMS operating mode, as described above, advances the timing of the IVC to reduce pumping losses, increases charge dilution to improve efficiency, and substantially reduces emissions of NOx during warm operating conditions relative to an engine having conventional valve actuation and/or relative to an engine with two-step VVA. The reduction in NOx emissions and the improvement in fuel economy that are achieved by TSVVA system 10 are approximately equal to the benefits achieved therein by a continuously variable valve actuation mechanism, yet TSVVA 10 is operable over a substantially wider range of engine operating speeds than are conventional continuously variable valve actuation mechanisms.

Figure 7:
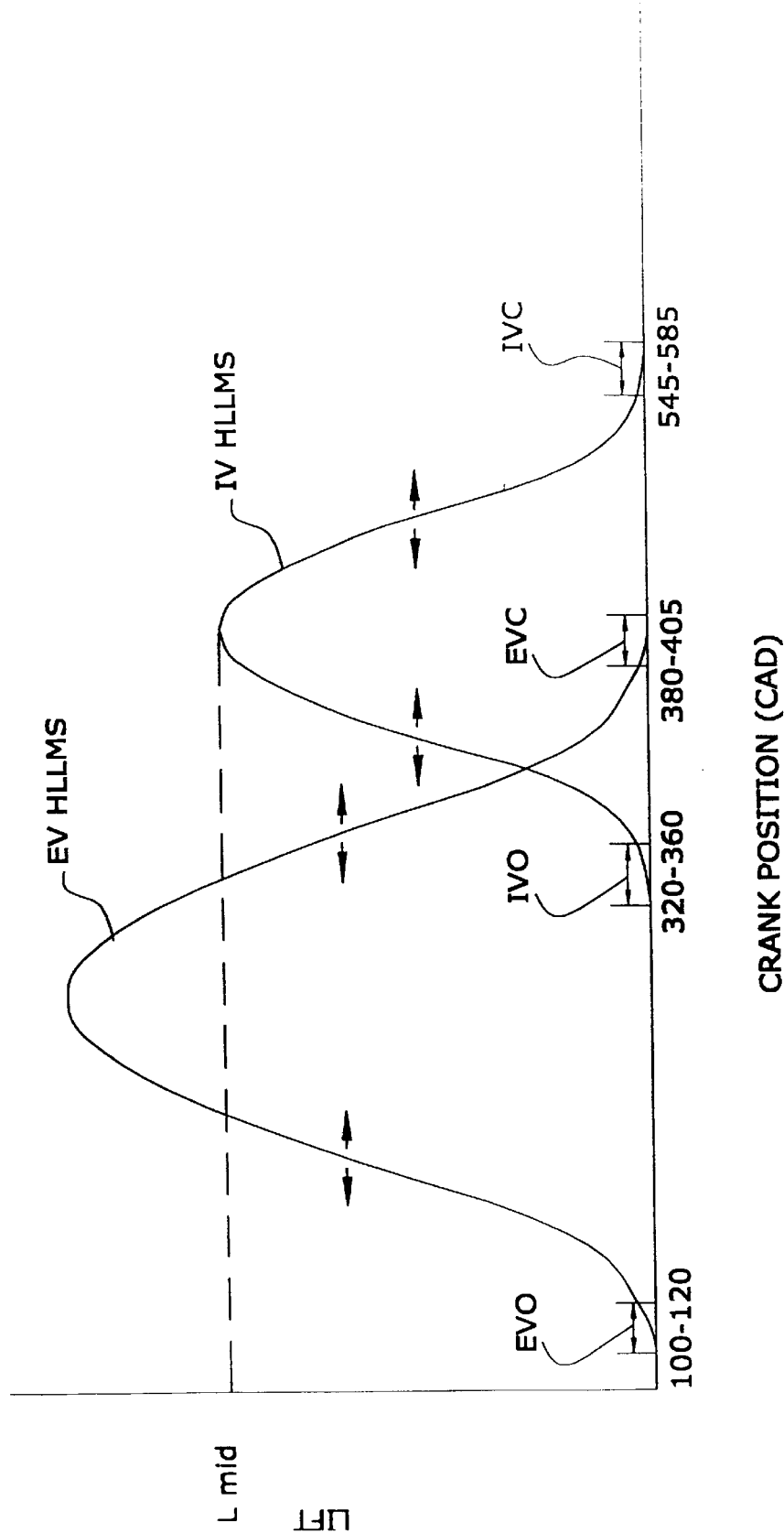
FIG. 7 is a plot of the exhaust and intake valve lift profiles for the TSVVA of FIG. 1 operating in the high-load, low-to-medium speed operating mode.

The fifth primary operating mode, i.e., high-load low-to-medium speed (HLLMS), controls three-step switching devices 16 and intake and exhaust cam phasers 18 and 20, respectively, to place TSVVA system 10, and thereby engine 40, into an operating mode wherein the lift, timing and duration of the intake and exhaust valves are optimized to achieve high volumetric efficiency for a low-to-medium engine operating speed range. Fifth or HLLMS operating mode is invoked, for example, for BMEPs of from approximately 900 to approximately 1,100 kPa and for engine speeds of from approximately 600 to approximately 2,500 rpm. The exhaust and intake valve lift profiles, designated $EV_{HLLMS}$ and $IV_{HLLMS}$, respectively, for the HLLMS operating mode are shown in FIG. 7.

Lift profile $EV_{HLLMS}$ shows that in the HLLMS operating mode exhaust cam phaser 20 is controlled to implement an EVO that occurs from approximately 100 to approximately 120 CAD, and an EVC that occurs from approximately 380 to approximately 405 CAD. The EVO and EVC are increasingly advanced as engine speed increases. The lift of the exhaust valves is fixed as described above.

Lift profile $IV_{HLLMS}$ shows that in the HLLMS operating mode intake cam phaser 18 is controlled to implement an IVO that occurs from approximately 320 to approximately 360 CAD, and an IVC that occurs at approximately 545 to approximate 585 crank angle degrees. The IVO and IVC are increasingly delayed relative to crank angle as engine operating speed increases. The three-step switching devices that actuate the intake valves are placed into the medium-lift position or mode, and are thus engaged by corresponding medium-lift cams of the camshaft of engine 40 which impart a medium-level lift $L_{MED}$ to the corresponding intake valves.

The HLLMS operating mode, as described above, provides an increase in volumetric efficiency of approximately ten percent relative to a conventional engine. The magnitude of this improvement depends on engine application.

Figure 8:
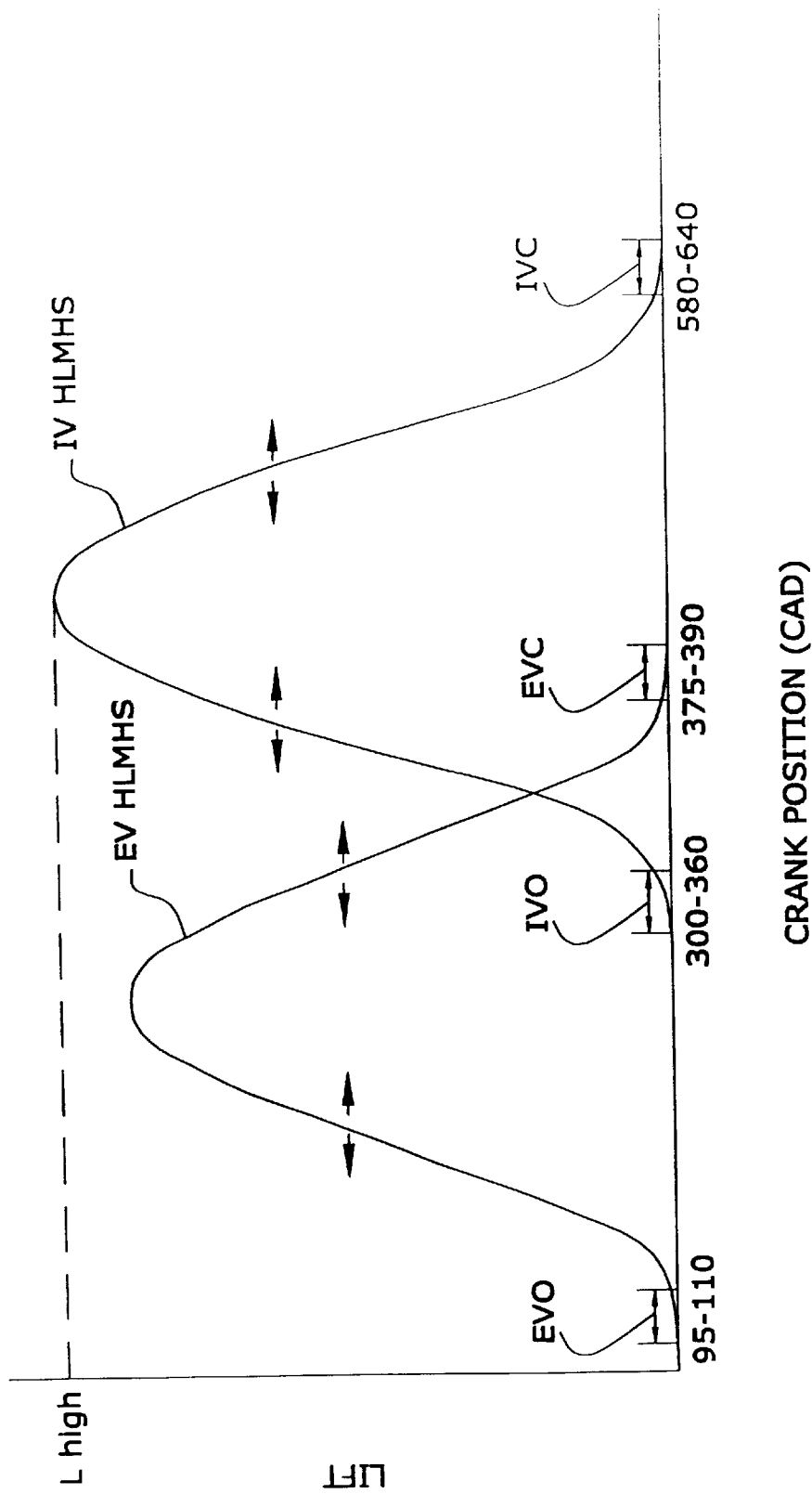
FIG. 8 is a plot of the exhaust and intake valve lift profiles for the TSVVA of FIG. 1 operating in the high-load, medium-to-high speed operating mode.
Figure 9:
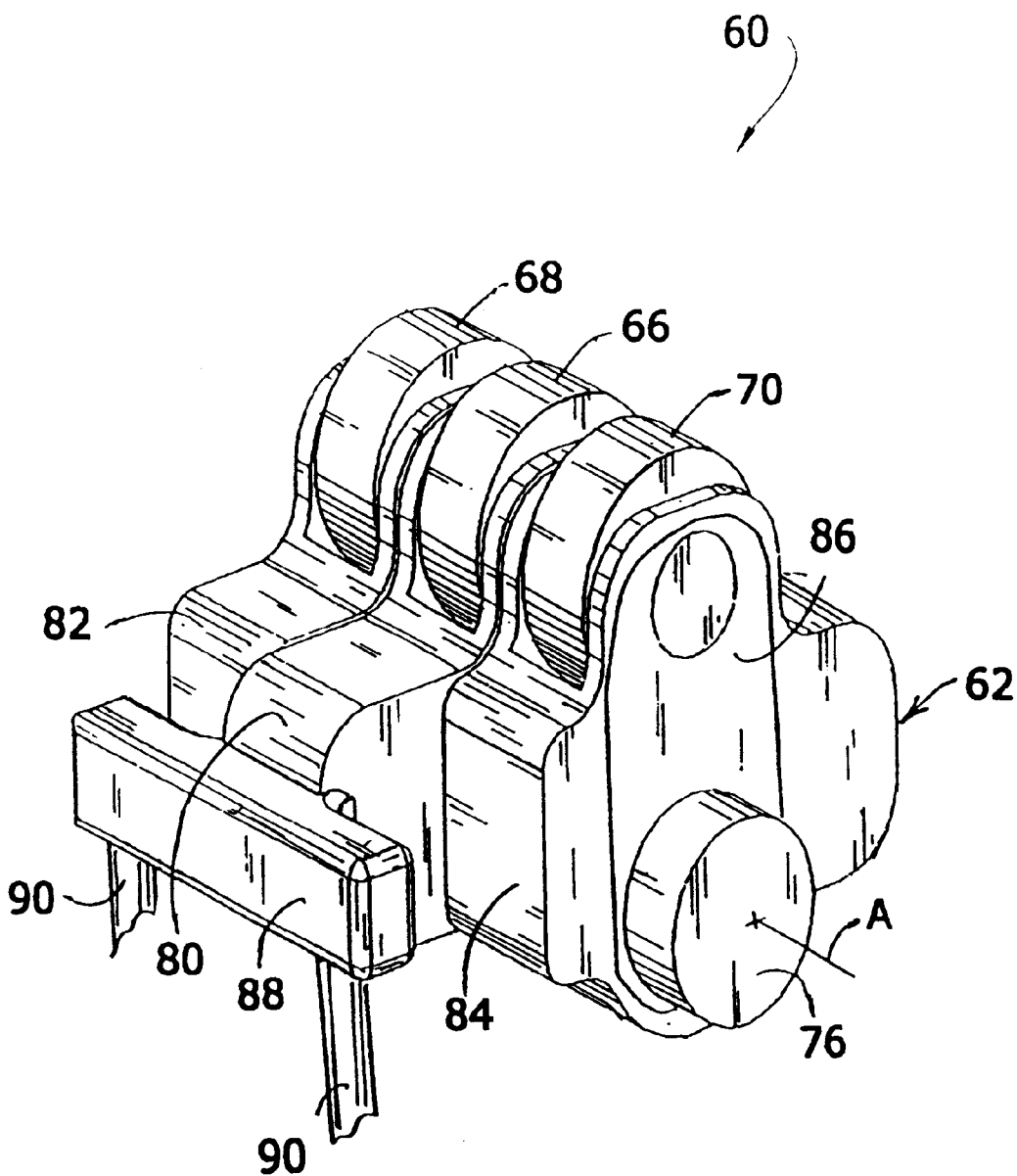
FIG. 9 is a perspective view of one embodiment of a three-step switching device of the TSVVA of FIG. 1.
Figure 10:
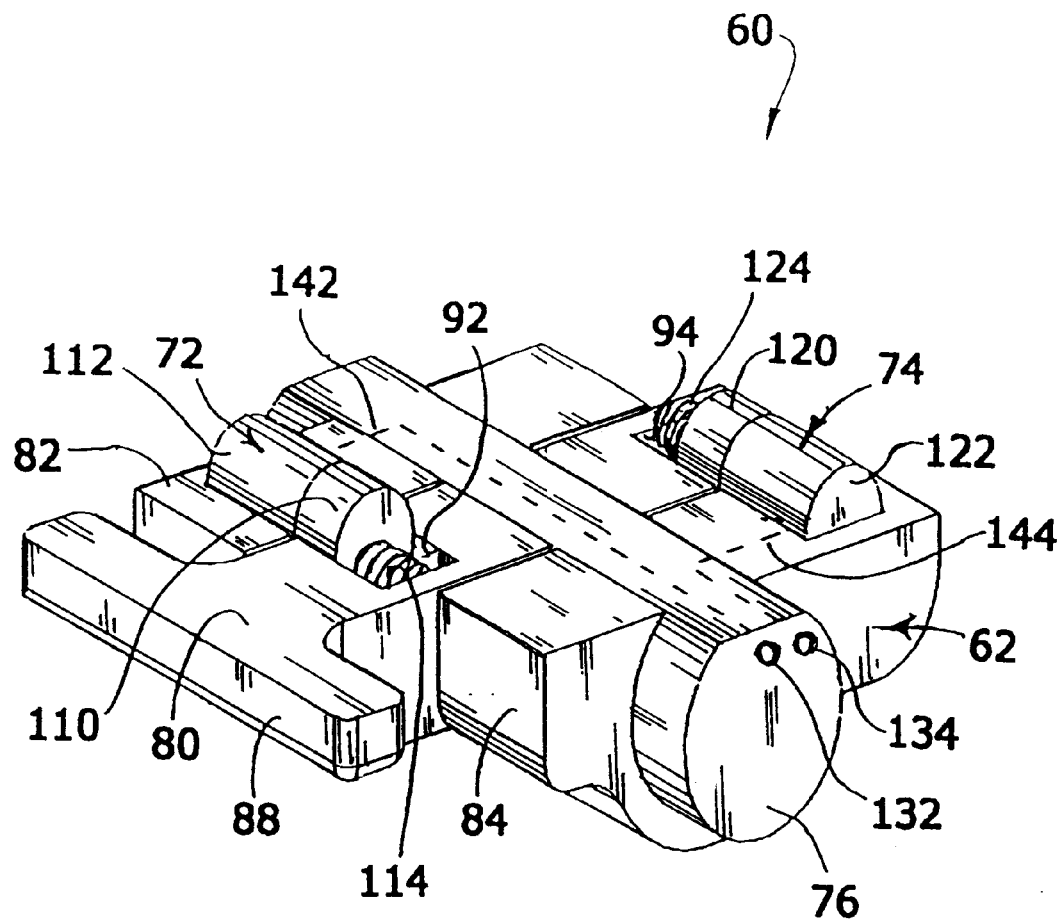
FIG. 10 is a cross-sectional view of the three-step switching device of FIG. 9 in a first mode of operation.
Figure 11:
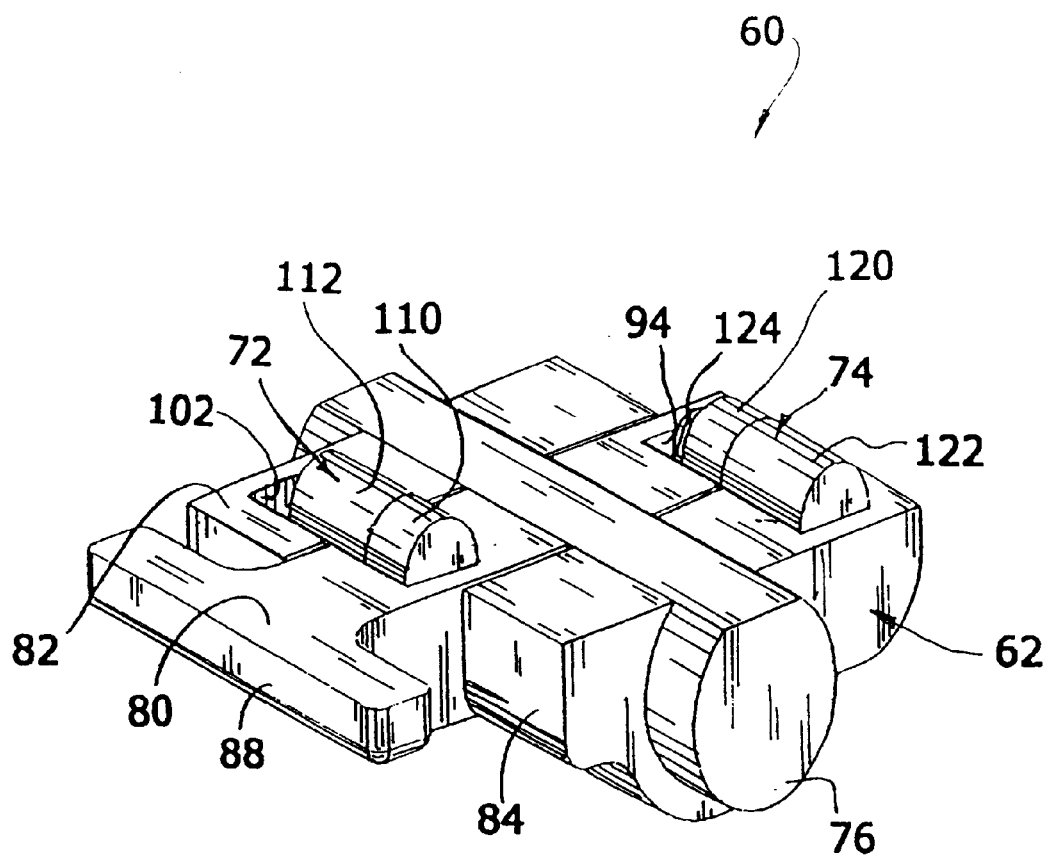
FIG. 11 is a cross-sectional view of the three-step switching device of FIG. 9 in a second mode of operation.
Figure 12:
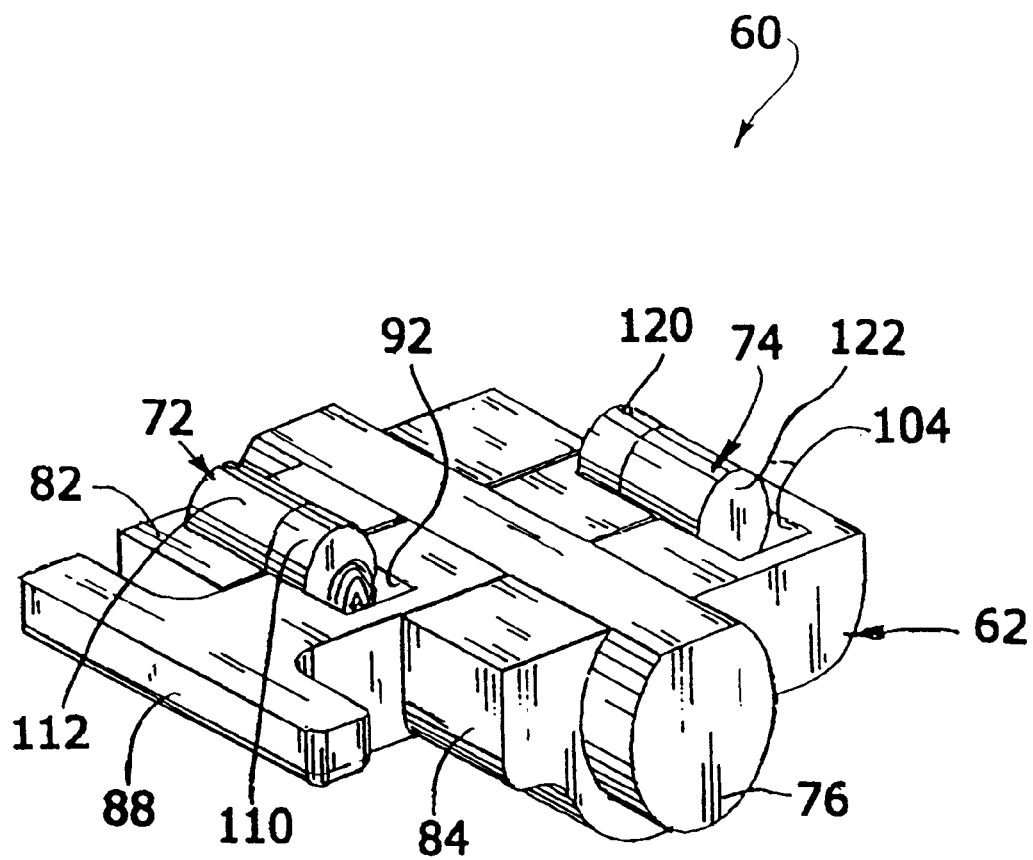
FIG. 12 is a cross-sectional view of the three-step switching device of FIG. 9 in a third mode of operation.

The sixth primary operating mode, i.e., high-load medium-to-high speed (HLMHS), controls three-step switching devices 16 and intake and exhaust cam phasers 18 and 20, respectively, to place TSVVA system 10, and thereby engine 40, into an operating mode wherein the lift, timing and duration of the intake and exhaust valves are optimized to achieve high volumetric efficiency for medium-to-high engine operating speeds, such as, for example, from approximately 2,000 to approximately 8,000 rpm and greater. Sixth or HLMHS operating mode is invoked for BMEPs of from approximately 1,000 to approximately 1,200 kPa and for engine speeds of greater than approximately 2,500 rpm. The exhaust and intake valve lift profiles, designated $EV_{HLMHS}$ and $IV_{HLMHS}$, respectively, for the HLMHS operating mode are shown in FIG. 8.

Lift profile $EV_{HLMHS}$ shows that in the HLMHS operating mode exhaust cam phaser 20 is controlled to implement an EVO that occurs from approximately 95 to approximately 110 CAD, and an EVC that occurs from approximately 375 to approximately 390 CAD. The EVO and EVC are generally advanced as much as possible over this speed range to maximize volumetric efficiency. The lift of the exhaust valves is fixed as described above.

Lift profile $IV_{HLMHS}$ shows that in the HLMHS operating mode intake cam phaser 18 is controlled to implement an IVO that occurs from approximately 300 to approximately 360 CAD, and an IVC that occurs at approximately 580 to approximately 640 crank angle degrees. The IVO and IVC are increasingly delayed relative to crank angle as engine operating speed increases. The three-step switching devices that actuate the intake valves are placed into the high-lift position or mode, and are thus engaged by corresponding high-lift cams of the camshaft of engine 40 which impart a high-level lift $L_{HIGH}$ to the corresponding intake valves.

The HLMHS operating mode, as described above, provides increases in torque and peak power relative to a conventional engine due to improved optimization of valve lift and duration over the speed range. If peak engine speed is increased, peak power can also be increased. For example, at an engine operating speed of 8,000 rpm a peak power improvement of engine 40 of approximately 10 to 20 percent is achieved.

It should be noted that the intake and exhaust valve lift profiles for each of the above-described operating modes are substantially continuously adjustable by the associated cam phasers within and over the respective and indicated ranges for IVO, IVC, EVO and EVC. This adjustability is indicated by the arrows associated with each of the valve lift profiles in FIGS. 3–8.

Figure 2:
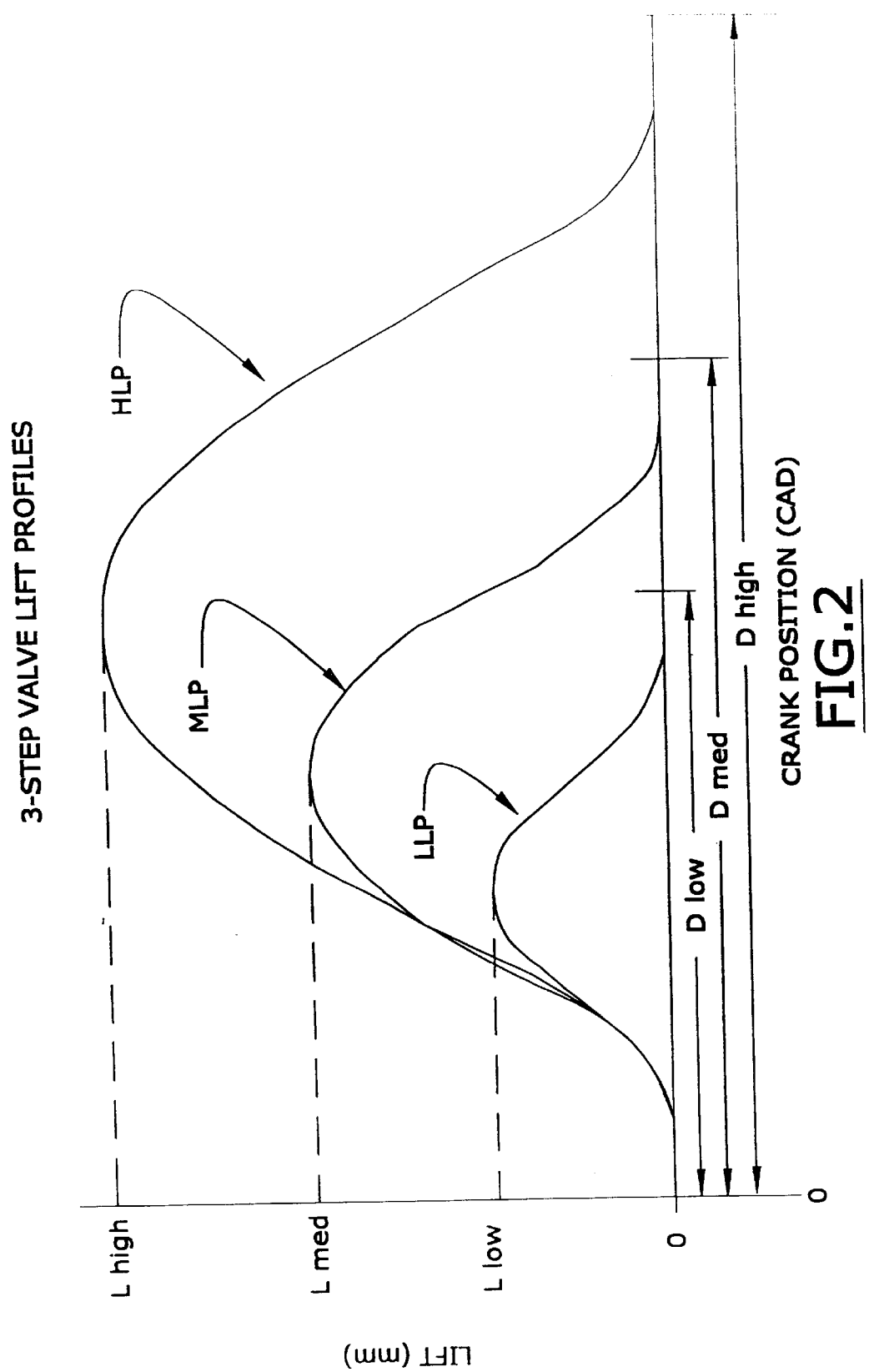
FIG. 2 is a plot of the un-phased intake valve lift profiles for the TSVVA of FIG. 1.

It should further be noted that the low, medium and high-lift cams, in addition to having different maximum lift amounts, are generally configured with lift profiles having different lift durations configured to, for example, increase fuel economy and/or improve torque and/or increase peak power. More particularly, as shown in FIG. 2 and as described above, the HLP lift profile has a relatively high maximum lift $L_{HIGH}$, as described above, that occurs relatively late (i.e., at a relatively high crank angle), whereas the MLP lift profile has a medium value of maximum lift $L_{MED}$ that occurs relatively early (i.e., at a relatively low crank angle). Similarly, the LLP profile has a relatively low maximum lift $L_{LOW}$ that occurs relatively early (i.e., at a relatively low crank angle). Intake and exhaust cam phasers 18 and 20, respectively, phase the crank angle at which these lift profiles occur dependent at least in part upon engine operating conditions and parameters.

Referring again to FIG. 1, one actuating device 48, such as, for example, an electronically controlled fluid control valve, is associated with all three-step switching devices 16 in a cylinder head. If a second cylinder head exists on the engine, a second actuating device is used. Actuating device 48, as is more particularly described hereinafter, controls the flow of a pressurized fluid to three-step switching device 16 thereby switching the device between the above-described low, medium and high-lift operating positions. As stated above, only one three-step switching device and only one actuating device are shown for the sake of clarity. Each three-step actuating device 48 is electrically interconnected with a respective switching output 46b (only one shown) of ECM 14. However, it is to be understood that alternate switching methods and modes may be implemented, such as, for example, one switching or control device to switch multiple three-step devices between low-lift mode to medium-lift mode, and another switching or control device to switch multiple three-step devices between medium-lift mode to high-lift mode.

Intake cam phaser 18 is a conventional cam phaser as described in commonly-assigned U.S. Pat. No. 6,276,321, the disclosure of which is incorporated herein by reference. Intake cam phaser 18 enables phasing of the intake cam relative to the engine crankshaft, i.e., the angular position of the camshaft relative to the crankshaft (not shown) of engine 40. Intake cam phaser 18 thus enables the opening and/or closing of the intake valves of engine 40 to be phased relative to the rotational or angular position of the crank, thereby phasing the opening and/or closing of the valves relative to piston position. Preferably, intake cam phaser 18 has an average or moderate range of authority. Associated with intake cam phaser 18 is intake cam phaser actuating device 50 and intake cam position sensor 52.

Intake phaser actuating device 50, such as, for example, a fluid control valve or electric motor, is associated with and actuates intake cam phaser 18. Intake phaser actuating device 50 is electrically interconnected with intake phaser control output 46c of ECM 14. Intake cam position sensor 52, such as, for example, a conventional electrical, optical or electromechanical cam position sensor, is associated with intake cam phaser 18. Intake cam position sensor 52 is electrically connected to intake cam position input 44d of ECM 14.

Similarly, exhaust cam phaser 20 is a conventional cam phaser that enables the phasing of the opening and/or closing of the exhaust valves of engine 40 relative to the rotational or angular position of the crankshaft. Preferably, exhaust cam phaser 20 also has an average or moderate range of authority. Associated with exhaust cam phaser 20 is exhaust cam phaser actuating device 53 and exhaust cam position sensor 54.

Exhaust phaser actuating device 53 is substantially identical to intake phaser actuating device 50 as described above, and is electrically interconnected with exhaust phaser control output 46d of ECM 14. Exhaust cam position sensor 54 is substantially identical to electrically intake cam position sensor 52 described above, and is connected to exhaust cam position input 44g of ECM 14.

Electronic throttle control module (ETC) 22 is a conventional electronic throttle control module, and includes ETC actuating device 56 and throttle position sensor (TPS) 57. ETC 22 further includes a main throttle valve 58 that controls the flow of air into engine 40. ETC actuating device 56, such as, for example, a stepper motor, is electrically connected to throttle control output 46a of ECM 14, and is operable to rotate main throttle valve 58 to a desired position. TPS sensor 57 is a conventional throttle position sensor, which senses the position of throttle valve 58 and is electronically connected throttle position input 44c of ECM 14.

Mass air flow (MAF) sensor 24 is a conventional mass airflow sensor that measures the amount of air flowing through main throttle valve 58. MAF sensor 24 is electrically connected to MAF sensor input 44b of ECM 14.

Referring now to FIGS. 9–12, one embodiment of a three-step switching device for use in TSVVA 10 is shown. Generally, three step switching device 60 is configured as a rocker arm having three cam followers, each of which are associated with a corresponding one of three rocker arm sections that are selectively and pivotally coupled together and decoupled from each other to thereby switch switching device 60 into and between the low, medium and high-lift operating positions. Three step switching device 60 includes body 62, cam followers 66, 68 and 70, high-lift mode locking assembly 72 (FIG. 10), medium-lift mode locking assembly 74 (FIG. 10) and shaft 76.

Body 62 includes three elongate arm portions, i.e., main or central arm 80, high-lift arm 82 and medium-lift arm 84. Each of main arm 80, high-lift arm 82 and medium-lift arm 84 are pivotally disposed upon shaft 76. More particularly, each of arms 80, 82 and 84 include respective central bores (not referenced) within which shaft 76 is received and through which shaft 76 extends. Arms 80, 82 and 84 are disposed on shaft 76 such that medium-lift arm 84 is disposed adjacent one side of main arm 80 and high-lift arm 82 is disposed adjacent the other side of main arm 80. Arms 80, 82 and 84 are configured for pivotal movement relative to and/or about central axis A of shaft 76. Arms 80, 82 and 84 are retained in a predetermined axial position on shaft 76, and axially adjacent each other, by a retaining means 86, such as, for example, a retaining clip or C-clip, that snaps onto and over body 62 and engages shaft 76 in such a manner as to preclude axial movement of body 62.

Main or central arm 80 is an elongate arm member including a first, generally T-shaped end 88 disposed on one side of shaft 76 and configured for engaging one or more valve stems 90 (shown in FIG. 9 only) of one or more engine valves. A second end (not referenced) of main arm 80 is disposed on the opposite side of shaft 76 from T-shaped first end 88. Main arm 80 defines first orifice 92 (FIG. 10) proximate first or T-shaped end 88. First orifice 92 extends from the outer surface of main arm 80 that is adjacent high-lift arm 82 in a direction toward medium-lift arm 84. Main arm 80 also defines at the second end thereof, i.e., the end opposite end 88, a second orifice 94 (FIG. 10) that extends from the outer surface of main arm 80 that is adjacent medium-lift arm 84 in a direction toward high-lift arm 82.

High-lift arm 82 is an elongate arm member having ends (not referenced) that are disposed on opposite sides of shaft 76. High-lift arm 82 defines orifice 102 (FIG. 11), which extends from an outer surface (not referenced) of high-lift arm 82 that is adjacent to main arm 80, and in a direction away from main arm 80. Orifice 102 of high-lift arm 82 is substantially coaxial relative to first orifice 92 of main arm 80 when arms 80 and 82 are in the same angular orientation relative to shaft 76.

Medium-lift arm 84 is an elongate arm member having ends (not referenced) that are disposed on opposite sides of shaft 76. Medium-lift arm 84 defines orifice 104 (FIG. 12), which extends from an outer surface (not referenced) of medium-lift arm 84 that is adjacent to main arm 80, and in a direction away from main arm 80. Orifice 104 of medium-lift arm 84 is substantially coaxial relative to second orifice 94 of main arm 80 when arms 80 and 84 are in the same angular orientation relative to shaft 76.

High-lift mode locking assembly 72, in general, couples together and decouples high-lift arm 82 and main arm 80. High-lift mode locking assembly 72 includes main pin 110, high-lift pin 112 and biasing means 114. Main pin 110 is disposed substantially entirely within first orifice 92 in main arm 80. High-lift pin 112 is disposed at least partially within orifice 102 in high-lift arm 82. Biasing means 114 is disposed within orifice 92 of main arm 80, between and in engagement with main pin 110 and the inside end surface (not referenced) of first orifice 92 that is perpendicular to central axis A of shaft 76.

Medium-lift mode locking assembly 74, in general, couples together and decouples medium-lift arm 84 and main arm 80. Medium-lift mode locking assembly 74 includes main pin 120, medium-lift pin 122 and biasing means 124. Main pin 120 is disposed substantially entirely within second orifice 94 in main arm 80. Medium-lift pin 122 is disposed at least partially within orifice 104 in medium-lift arm 84. Biasing means 124 is disposed within orifice 94 of main arm 80, between and in engagement with main pin 120 and the inside end surface (not referenced) of second orifice 94 that is perpendicular to central axis A of shaft 76.

Shaft 76 is an elongate shaft member upon which one or more three-step switching devices are pivotally disposed. Shaft hydraulic channels 132 and 134 (shown in FIG. 10 only) are defined by and within shaft 76, and are at one end in fluid communication with a source of pressurized fluid (not shown), such as, for example, hydraulic fluid or engine oil. Corresponding high and medium-lift arm hydraulic channels 142 and 144 (shown in FIG. 10 only), respectively, are defined by high and medium-lift arms 82 and 84, respectively, and are fluidly connected at one end to the ends of shaft channels 132 and 134, respectively, that are opposite the source of pressurized fluid. Arm channels 142 and 144 are in fluid communication with orifices 102 and 104, respectively. Orifice 102 of high-lift arm 82 is in fluid communication the source of pressurized fluid via arm channel 142 and shaft channel 132. Similarly, orifice 104 of medium-lift arm 84 is in fluid communication the source of pressurized fluid via channel 144 and shaft channel 134. As the arms undergo pivotal movement, fluid communication of arm channels 142 and 144 with corresponding shaft channels 132 and 134 is maintained by at least one pair of the channels, for example, the arm channels 142 and 144, having elongated or flared ends (not shown) at the interface thereof with the corresponding channels. A fluid control device, such as, for example, an electrically actuated fluid control valve, controls the flow of fluid into and through shaft hydraulic channels 132 and 134 and thereby through arm hydraulic channels 142 and 144.

Figure 13:
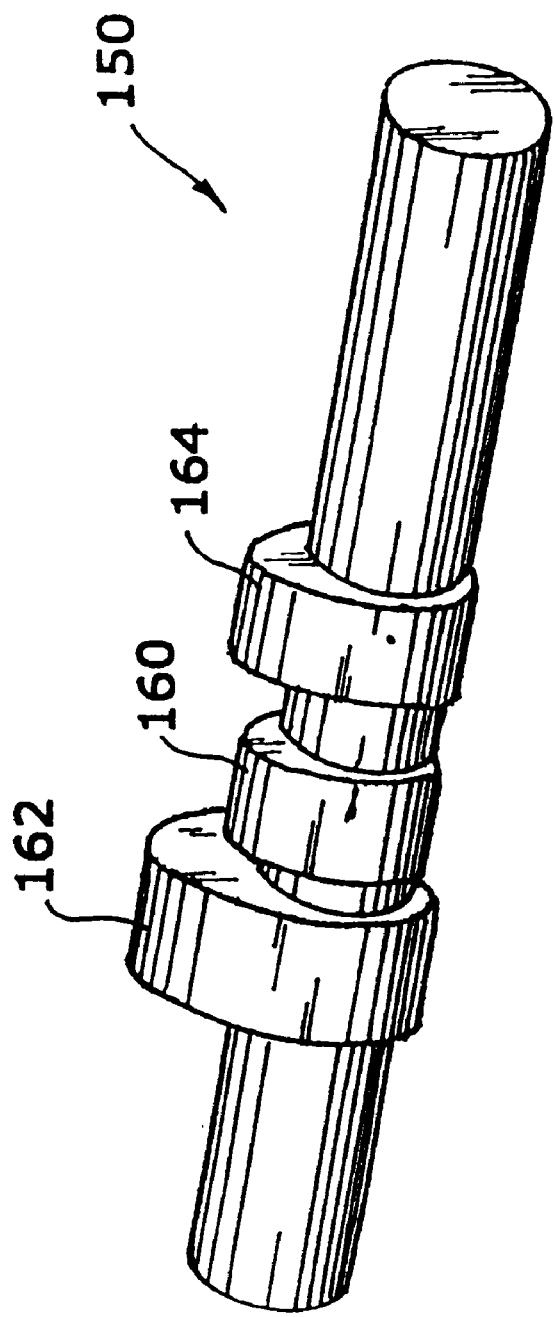
FIG. 13 is a perspective view of one embodiment of a camshaft of the TSVVA of FIG. 1.

Cam followers 66, 68 and 70, such as, for example, rollers with bearings, are carried by arms 80, 82 and 84, respectively. Generally, each of cam followers 66, 68 and 70 engage a corresponding cam of three-step camshaft 150 of TSVVA 10. More particularly, as shown in FIG. 13, camshaft 150 includes low-lift cam 160, high-lift cam 162 and medium-lift cam 164. Cam follower 66 of main arm 80 engages low-lift cam 160, cam follower 68 of high-lift arm 82 engages high-lift cam 162, and cam follower 70 of medium-lift arm 84 engages medium-lift cam 164 of camshaft 150.

In use, three-step switching device 16 is placed into a default position or mode of operation by biasing means 114 biasing pins 110 and 112 toward and into a default position wherein main pin 110 is disposed substantially entirely within orifice 92 and high-lift pin 112 is disposed substantially entirely within orifice 102 thereby decoupling main arm 80 from high-lift arm 82, and by biasing means 124 biasing pins 120 and 122 toward and into a default position wherein main pin 120 is disposed substantially entirely within second orifice 94 and medium-lift pin 122 is disposed substantially entirely within orifice 104 thereby decoupling main arm 80 from medium-lift arm 84. Each of cam followers 66, 68 and 70 follow their associated/corresponding cams 160, 162 and 164, respectively, and arms 80, 82 and 84 are thereby pivoted relative to shaft 76. Thus, since main/low-lift arm 80 is the only arm that engages and/or actuates the associated engine valve or valves, the valves of engine 40 are actuated according to the lift profile of low-lift cam 160, i.e., LLP (FIG. 2).

It should be particularly noted that orifices 102 and 104 must be at a relatively low pressure, hereinafter referred to as depressurized, that does not overcome the force of corresponding biasing means 114 and 124, respectively, in order for three-step switching device 16 to be placed into and/or remain in the default operating mode. It should also be noted that the default operating mode of three-step switching device 16 corresponds to the LLP and a low-lift mode of operation.

Three-step switching device 16 is placed into a high-lift mode of operation by supplying pressurized fluid into orifice 102 via arm hydraulic channel 142 and shaft channel 132 and with low-lift mode locking assembly occupying the default position (i.e., orifice 104 being depressurized). The pressurized fluid displaces high-lift mode locking assembly 72 from its default position and into a high-lift mode or position. More particularly, the pressurized fluid supplied to orifice 102 overcomes the force of biasing means 114 and displaces high-lift pin 112 in a direction toward main arm 80 and partially into first orifice 92. The disposition of high-lift pin 112 partially within each of first orifice 92 and orifice 102 in high-lift arm 82 pivotally couples together main arm 80 and high-lift arm 82. Thus, as low and high-lift cam followers 66 and 68, respectively, are engaged by their corresponding low and high-lift cams 160 and 162, respectively, high-lift arm 82 is pivoted relative to shaft 76 according to the lift profile of high-lift cam 162, i.e., HLP (FIG. 2). Since high-lift arm 82 is coupled to main arm 80 by high-lift locking assembly 72, main arm 80 is also pivoted according to the lift profile of high-lift cam 162 thereby actuating the valves of engine 40 according to the lift profile HLP (FIG. 2).

Three-step switching device 16 is placed into a medium-lift mode of operation through the supplying of pressurized fluid into orifice 104 via arm hydraulic channel 144 and shaft channel 134 and with high-lift mode locking assembly occupying the default position (i.e., orifice 102 being depressurized). The pressurized fluid displaces medium-lift mode locking assembly 74 from its default position and into a medium-lift mode or position. More particularly, the pressurized fluid supplied to orifice 104 overcomes the force of biasing means 124 and displaces medium-lift pin 122 in a direction toward main arm 80 and partially into second orifice 94. The disposition of medium-lift 122 pin partially within each of second orifice 94 and orifice 104 in medium-lift arm 84 pivotally couples together main arm 80 and medium-lift arm 84. Thus, as low and medium-lift cam followers 66 and 70, respectively, are engaged by their corresponding low and medium-lift cams 160 and 164, respectively, medium-lift arm 84 is pivoted relative to shaft 76 according to the lift profile of medium-lift cam 164, i.e., MLP (FIG. 2). Since medium-lift arm 84 is coupled to main arm 80 by medium-lift locking assembly 74, main arm 80 is also pivoted according to the lift profile of medium-lift cam 164 thereby actuating the valves of engine 40 according to the lift profile LLP (FIG. 2).

Figure 14:
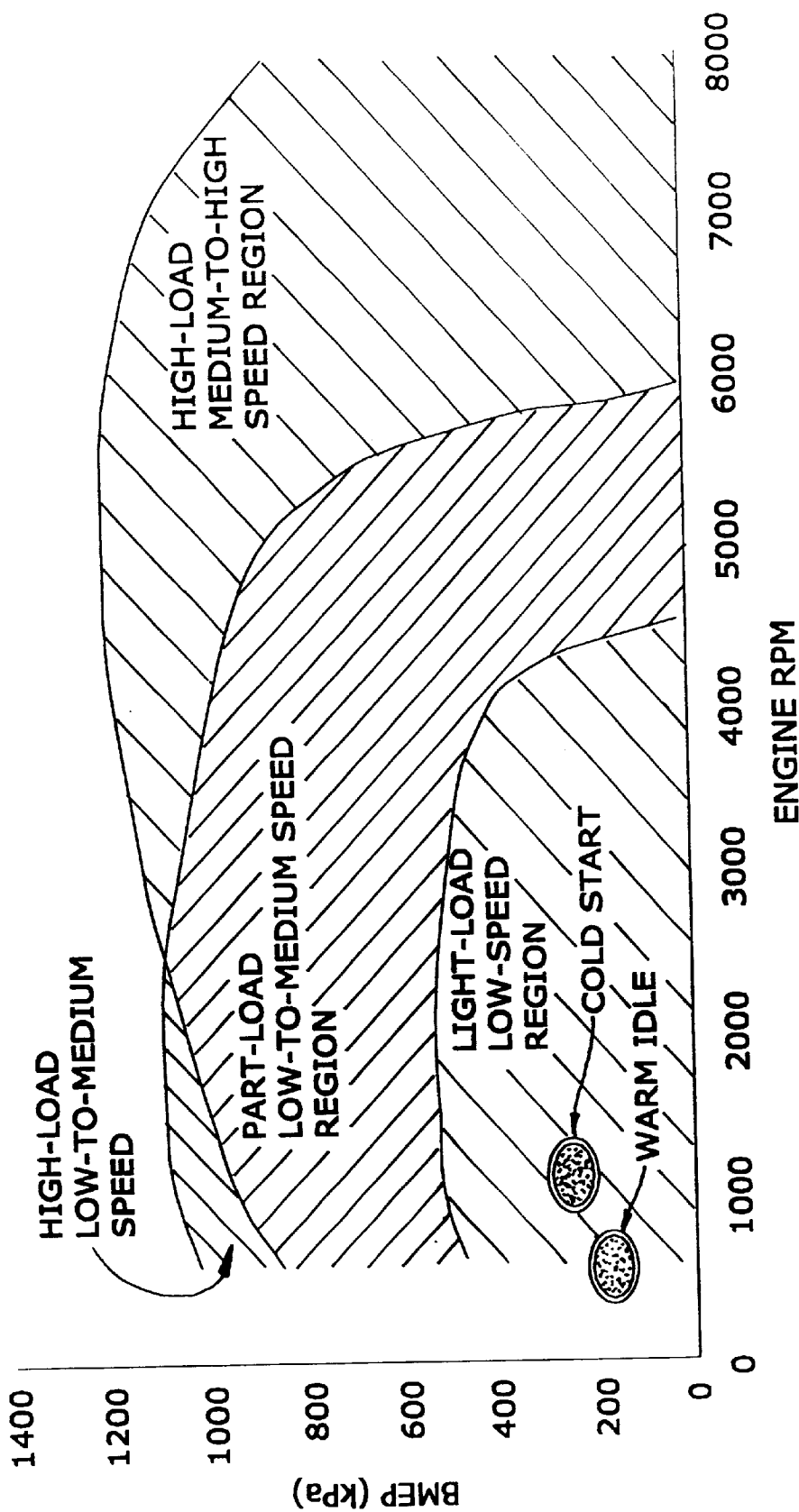
FIG. 14 is a plot illustrating the ranges of brake mean effective pressure (BMEP) and engine speed that correspond to each of the above-described operating modes of TSVVA system 10.

FIG. 14 shows the ranges of engine BMEP and engine speed that correspond to each of the above-described operating modes of TSVVA 10. More particularly, FIG. 14 shows that for ranges of engine BMEP and engine speed that fall within the light-load low-speed region, i.e., the region of the curve that corresponds to BMEPs of less than approximately 500 kPa at engine speeds of less than approximately 4,500 rpm, TSVVA 10 operates with three-step switching devices 16 in the low-lift position or mode of operation and within one of the cold-start idle, warm idle and light-load low speed operating modes as described above.

For ranges of BMEP and engine speed that fall within the part-load low-to-medium speed line, i.e., the region of the curve corresponding to BMEPs of equal to or greater than approximately 500 kPa up to engine speeds of approximately 4,000 rpm and BMEPs of less than approximately 1,000 kPa at an engine speed of approximately 6,000 rpm, TSVVA 10 operates with three-step switching devices 16 in the medium-lift position or mode of operation and within the part-load low-to-medium speed (PLLMS) operating mode as described above.

Similarly, for ranges of BMEP and engine speed that fall within the high-load low-to-medium speed region, i.e., the region of the curve corresponding to a BMEP of approximately 1,100 kPa at 2.500 rpm and lower, TSVVA 10 operates with three-step switching devices 16 in the medium-lift position or mode of operation and within the highl-load low-to-medium speed (HLLMS) operating mode as described above.

Lastly, for ranges of BMEP and engine speed that fall within the high-load medium-to-high speed region, i.e., the region of the curve corresponding to a BMEP of approximately 1,100 kPa at 2,500 rpm and higher, TSVVA 10 operates with three-step switching devices 16 in the high-lift position or mode of operation and within the high-load medium-to-high speed (HLMHS) operating mode as described above.

Figure 15:
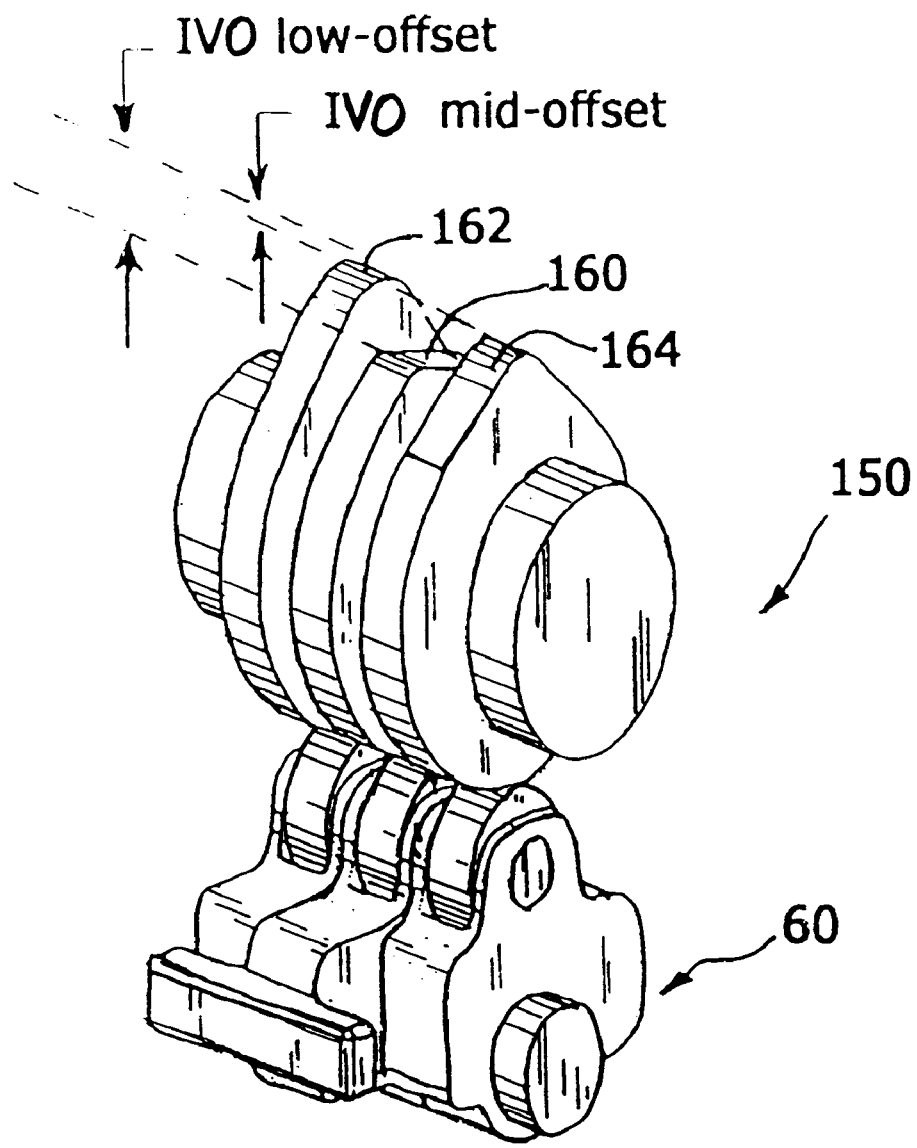
FIG. 15 is a perspective view of one embodiment of a camshaft having low, medium and high-lift cam lobes, and having a relative offset between the low and high-lift cam lobes.

It should be noted that the TSVVA system 10 enables the use of conventional intake and exhaust cam phasers with moderate ranges of authority, such as, for example, 70 CAD for intake and 50 CAD for exhaust, and having conventional phaser rates. This is enabled by using IVO-offsets for the LLC and MLC relative to the HLC. The IVO-offsets define the offset of the opening points of each cam lobe as ground on the camshaft, and thereby the opening points of the associated engine valves. More particularly, and as best shown in FIG. 15, low-lift cam 160 is retarded by $IVO_{LOW-OFFSET}$, such as, for example, from approximately 25 to approximately 50 CAD (or 12.5 to 25 cam degrees) relative to high-lift cam 162. In the embodiment shown, medium-lift cam 164 is offset by $IVO_{MEDIUM-OFFSET}$, such as, for example, approximately zero degrees, relative to high-lift cam 162. However, it is to be understood that different values of offset for the low and medium-lift cams relative to the high-lift cam can be beneficially applied to the TSVVA system of the present invention.

Figure 16:
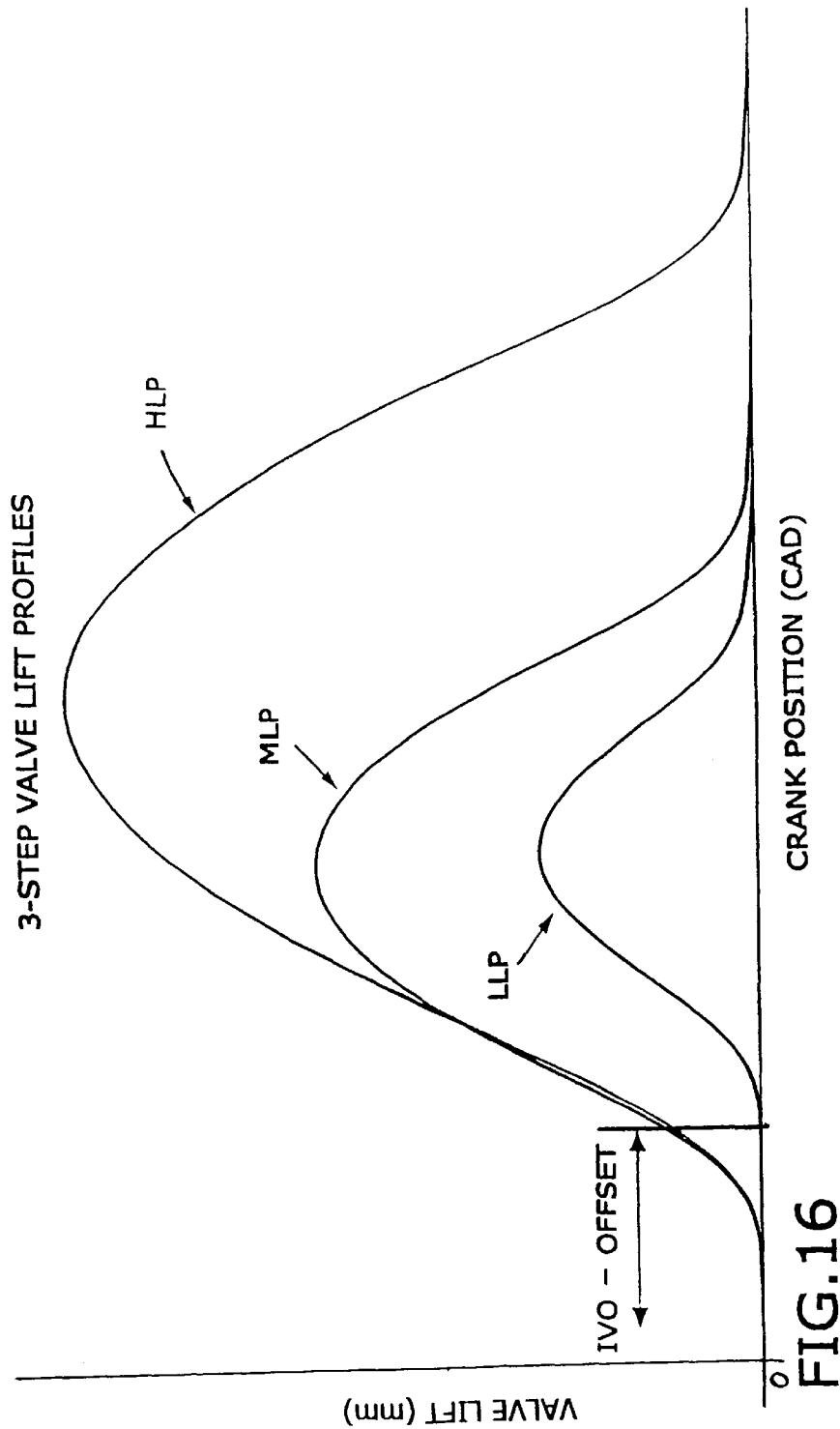
FIG. 16 is a plot of the intake valve lift profiles obtained with the camshaft of FIG. 15.

FIG. 16 illustrates the IVO-offset achieved by TSVVA system 10 using the above-described camshaft 150 wherein low-lift cam 160 is offset relative to high-lift cam 162. By offsetting low-lift cam 160 relative to high-lift cam 162, the IVO of the LLP is retarded relative to the IVO of the MLP and HLP. Thus, inherent IVO timing changes are accomplished by cam profile switching. This timing change is independent of timing changes provided by the intake cam phaser, and occurs substantially instantaneously during engine transients for which switching of modes occur. This inherent timing change substantially reduces demand on the intake phaser and the intake cam phaser rate. IVO offset of the LLC relative to the HLC also reduces the required authority of the phaser, since the additional phaser retard needed for the cold start engine operating mode is achieved at least in part by the offset of the LLC relative to the HLC. Generally, it is to be understood that IVO-offsets of the LLC and MLC relative to the HLC can be advantageously applied in the TSVVA system of the present invention.

FIG. 17 summarizes the operating modes and corresponding engine operating parameters and conditions of the TSVVA system of the present invention.

In the embodiment shown, the three step switching device 16 of the present invention includes cam followers 66, 68 and 70 that are configured as rollers with bearings. However, it is to be understood that the present invention can be alternately configured, such as, for example, with slider-pad type cam followers or other types of cam followers.

In the embodiment shown, the three step switching device 16 of the present invention has a default mode that corresponds to a low-lift mode of operation wherein the associated intake valve(s) are actuated according to a low-lift profile. However, it is to be understood that the present invention can be alternately configured, such as, for example, with the default mode corresponding to a medium-lift or high-lift mode of operation.

In the embodiment shown, the locking assemblies are biased by a biasing means, shown as a spring, into a default position to thereby place the three-step switching device into a default mode of operation. However, it is to be understood that the three-step switching device of the present invention can be alternately configured, such as, for example, with a different type of biasing means, such as, for example, a pressurized fluid, biasing the locking assemblies into a default position to thereby place the three-step switching device into a default mode of operation.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. An internal combustion engine, comprising:
    a camshaft having at least one set of cam lobes, said at least one set of cam lobes including a low-lift cam lobe, a medium-lift cam lobe and a high-lift cam lobe; and
    a three-step cam-profile-switching roller finger follower, including a body having a low-lift body section, a high-lift body section and a medium-lift body section, a low, high and medium cam follower carried by said low-lift, high-lift and medium-lift body sections, respectively, said low, high and medium cam followers engaging said low-lift, high-lift and medium-lift cam lobes, respectively, at least one locking assembly selectively coupling together and decoupling said low and said high-lift body sections, and selectively coupling together and decoupling said low and said medium-lift body sections, wherein at least one of said low-lift cam lobe and said medium-lift cam lobe is offset relative to said high-lift cam lobe.

2. The internal combustion engine of claim 1, wherein said low-lift cam lobe is offset relative to said high-lift cam lobe from approximately 20 to approximately 40 crank angle degrees.

* * * * *